United States Patent
Banjo et al.

(10) Patent No.: US 8,899,353 B2
(45) Date of Patent: Dec. 2, 2014

(54) POST HOLE DIGGER WITH INTEGRATED SAFETY FEATURES

(75) Inventors: Daniel Banjo, Boulder, CO (US); Chad Vernon Franke, Kennesburg, CO (US)

(73) Assignee: Blount, Inc., Portland, OR (US)

( * ) Notice: Subject to any disclaimer, the term of this patent is extended or adjusted under 35 U.S.C. 154(b) by 497 days.

(21) Appl. No.: 13/300,448

(22) Filed: Nov. 18, 2011

(65) Prior Publication Data

US 2012/0125693 A1    May 24, 2012

Related U.S. Application Data

(60) Provisional application No. 61/415,099, filed on Nov. 18, 2010.

(51) Int. Cl.
| | |
|---|---|
| E21B 10/44 | (2006.01) |
| E21B 7/02 | (2006.01) |
| F16P 1/02 | (2006.01) |
| F16P 3/10 | (2006.01) |

(52) U.S. Cl.
CPC . *E21B 7/027* (2013.01); *F16P 1/02* (2013.01); *F16P 3/10* (2013.01)
USPC ............................. 175/323; 175/162; 175/203

(58) Field of Classification Search
CPC ................ E21B 7/027; F16P 3/10; F16P 1/02
USPC .......... 175/162, 203, 170, 145, 323, 377, 25, 175/26; 74/612, 324
See application file for complete search history.

(56) References Cited

U.S. PATENT DOCUMENTS

| | | | | |
|---|---|---|---|---|
| 2,491,035 | A | * | 12/1949 | Deacon ........................... 74/609 |
| 3,700,045 | A | | 10/1972 | Coontz |
| 4,601,348 | A | * | 7/1986 | Cox ................................ 173/25 |
| 5,507,354 | A | | 4/1996 | Harleman |
| 5,558,169 | A | | 9/1996 | Madgwick |
| 6,155,359 | A | | 12/2000 | Gardner |
| 6,273,482 | B1 | | 8/2001 | Pickren |
| 6,725,950 | B2 | | 4/2004 | Palm |
| 7,097,404 | B2 | | 8/2006 | Avganim |
| 7,575,398 | B2 | * | 8/2009 | Lloyd et al. .................... 405/232 |
| 2003/0010536 | A1 | | 1/2003 | Swartz |

* cited by examiner

*Primary Examiner* — Yong-Suk (Philip) Ro
(74) *Attorney, Agent, or Firm* — Schwabe Williamson & Wyatt

(57) ABSTRACT

Embodiments provide safety features for a post hole digger, such as for attachment to a tractor or other utility device. The post hole digger has a boom and a yoke for pivotally connecting to the tractor or similar device, a driveline for transmitting rotational energy, and an auger for forming holes in a ground or floor surface. Rotating features of the post hole digger are isolated by various guard members, thereby enhancing the safety of the device.

15 Claims, 7 Drawing Sheets

POST HOLE DIGGER WITH INTEGRATED SAFETY FEATURES

CROSS REFERENCE TO RELATED APPLICATIONS

The present application claims priority to U.S. Provisional Patent Application No. 61/415,099, filed Nov. 18, 2010, entitled "Post Hole Digger with Integrated Safety Features," the entire disclosure of which is hereby incorporated by reference in its entirety.

TECHNICAL FIELD

Embodiments herein relate generally to post hole diggers, and more specifically to post hole diggers having various safety features.

BACKGROUND

Drilling and digging systems comprising rotating attachments are known to provide various advantages over traditional manually-operated hole digging instruments. By way of example, the following references are incorporated by reference herein in their entireties: U.S. Patent Application Publication No. 2003/0010536 to Swartz, U.S. Pat. No. 3,700,045 to Coontz, U.S. Pat. No. 6,273,482 to Pickren, U.S. Pat. No. 6,155,359 to Gardner, U.S. Pat. No. 6,725,950 to Palm, U.S. Pat. No. 5,507,354 to Harleman, and U.S. Pat. No. 5,558,169 to Madgwick et al.

Various devices are known to provide hole digging systems with rotational power inputs (PTO's or power take-offs) and/or means for attaching the systems to additional devices, such as tractors. However, known systems do not provide proper safety features. Without proper safety features, loose clothing and/or other objects can inadvertently get caught in moving parts, thus causing a safety hazard to a user or bystander.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1:
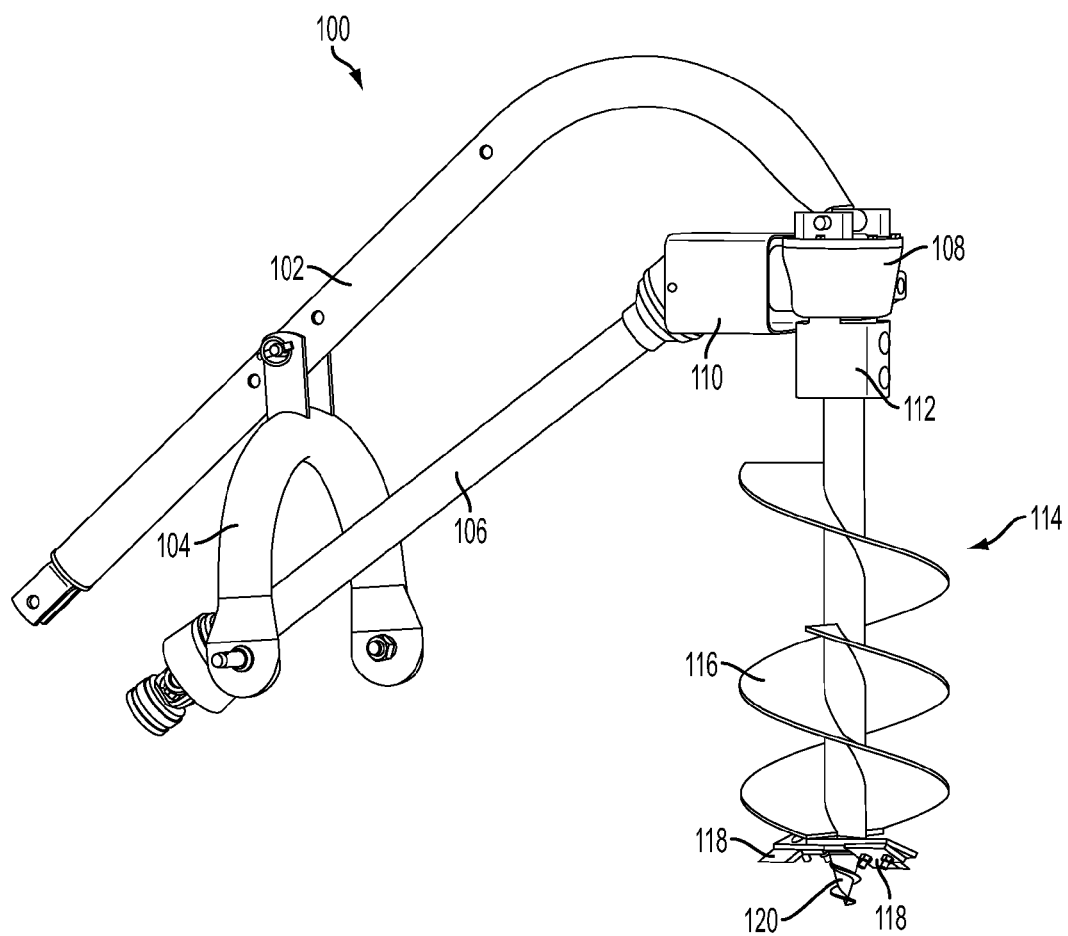
FIG. 1 illustrates a perspective view of a post hole digger with integrated safety guards in accordance with various embodiments.
Figure 2:
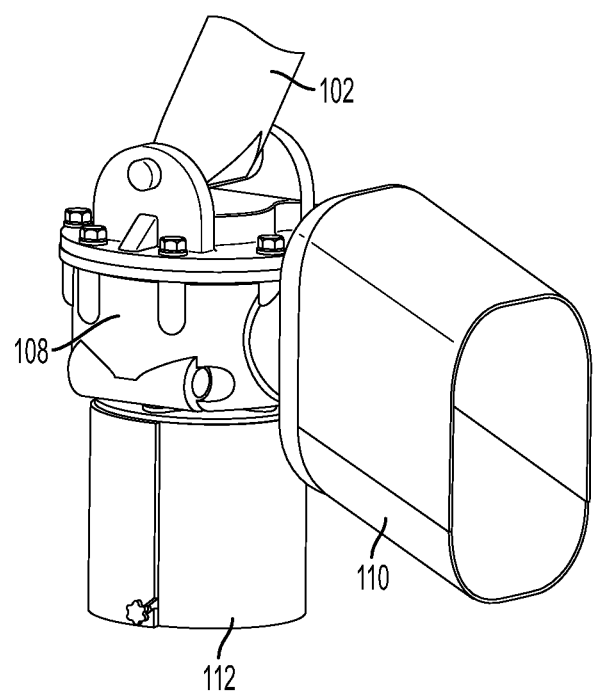
FIGS. 2-3 illustrate partial close-up views of safety guards in accordance with various embodiments.
Figure 3:
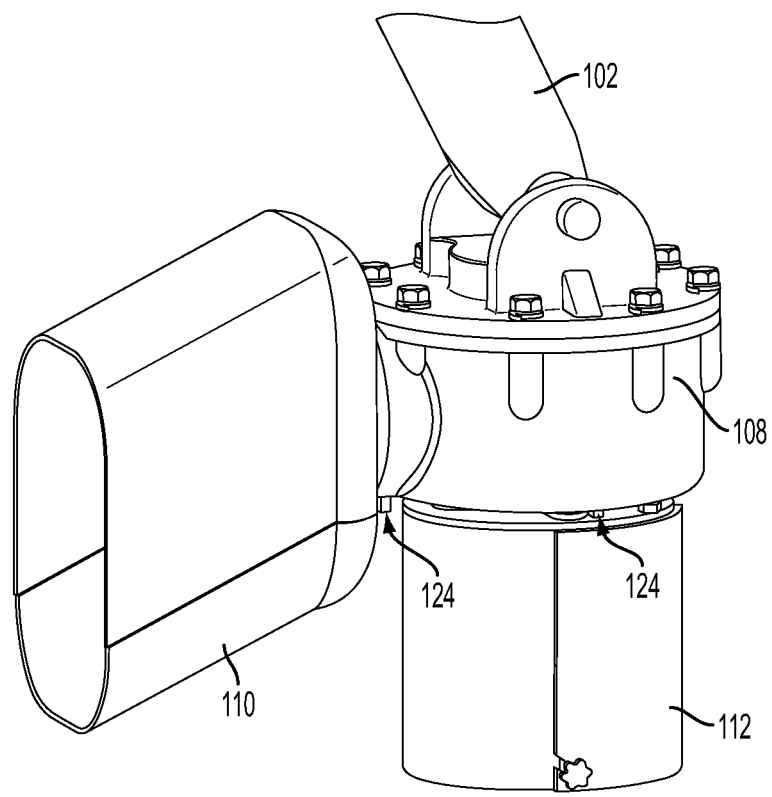
Figure 4:
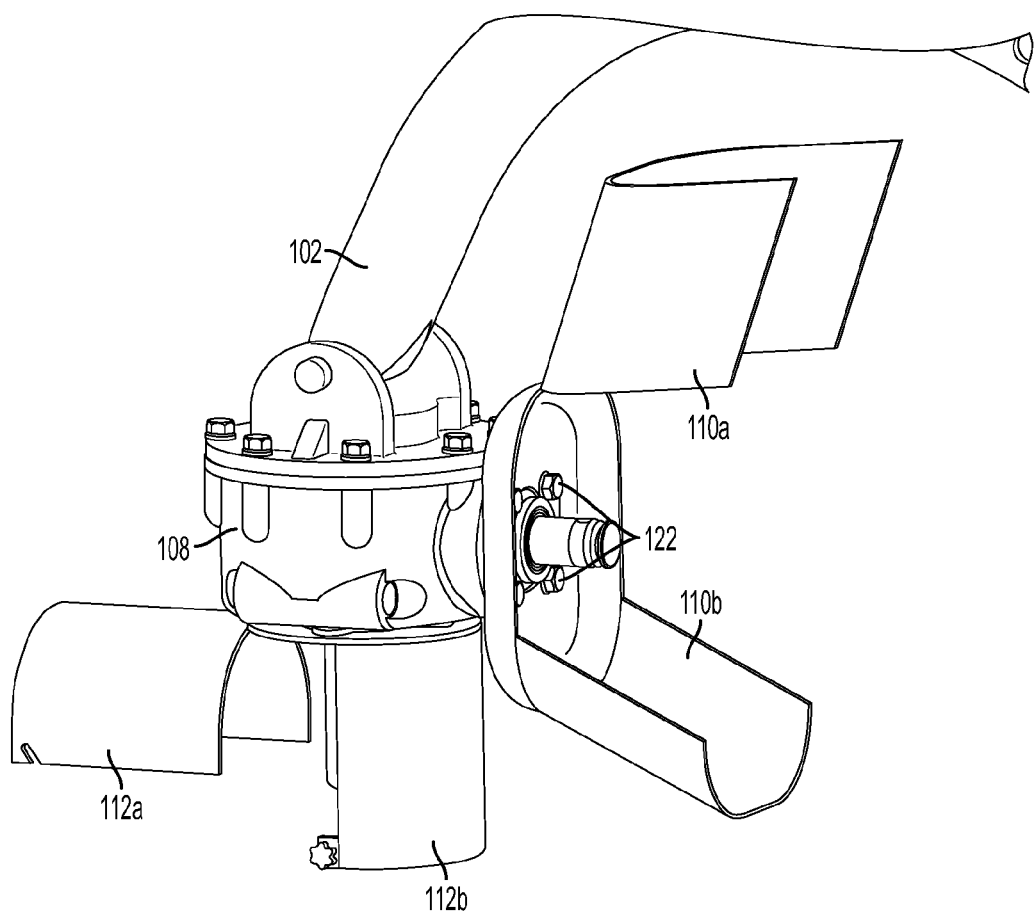
FIGS. 4-5 illustrate partial close-up views of safety guards in decoupled arrangements in accordance with various embodiments.
Figure 5:
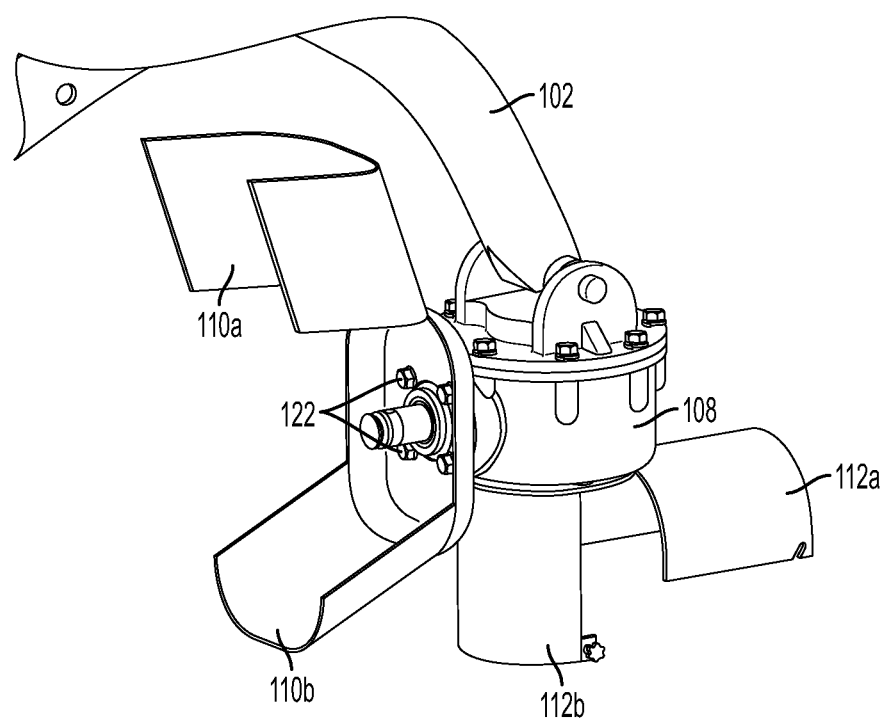
Figure 6:
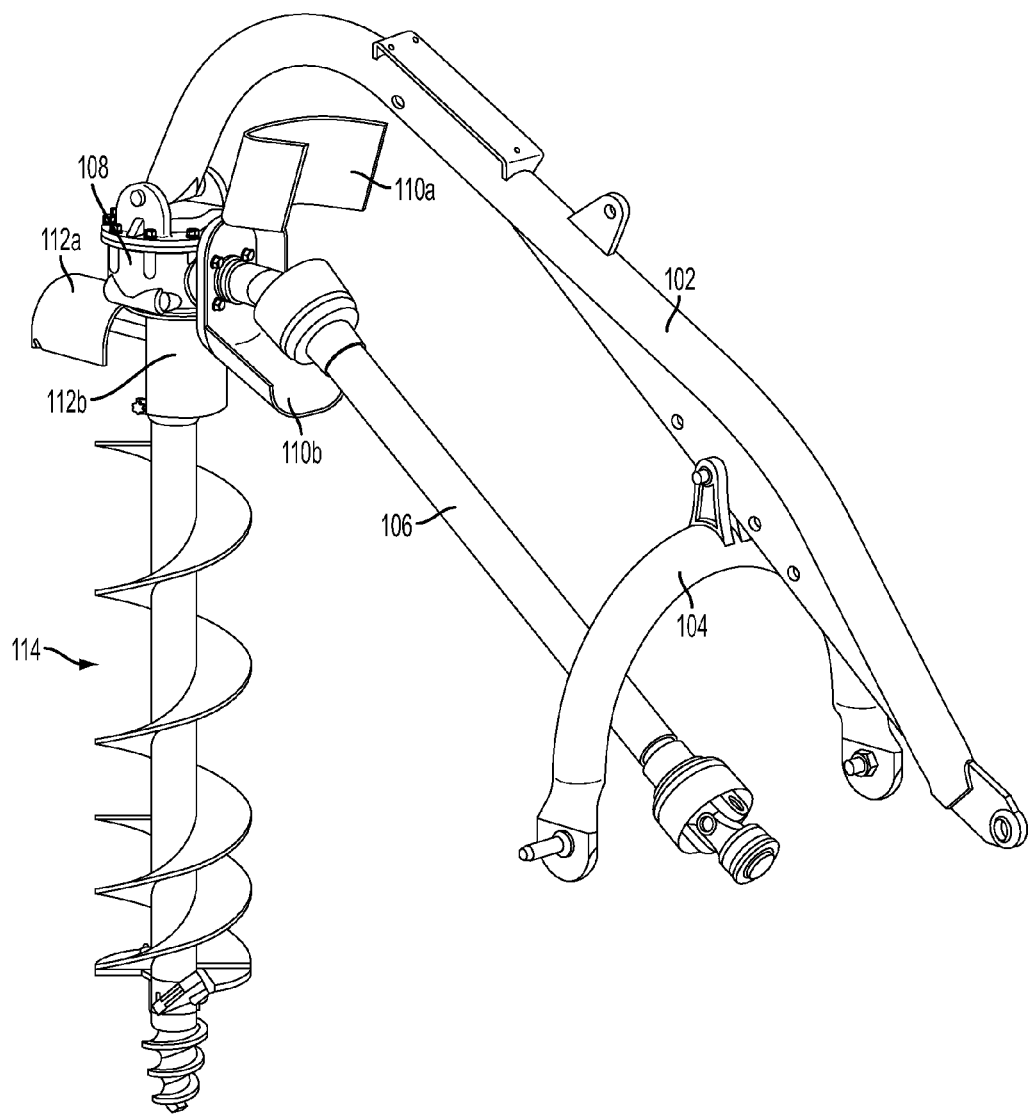
FIG. 6 illustrates a perspective view of a post hole digger with integrated safety guards in decoupled arrangements in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments herein provide a novel system and device for a post hole digger adapted for connection to a variety of devices or instruments and which further comprise various safety features and/or guards to prevent or limit access to portions of the device.

Embodiments provide a method and apparatus for a post hole digger having integrated safety features. In various embodiments, a post hole digger is contemplated as having one or more guard members for isolating, protecting, encircling, or housing a union or connection member. Such a union or connection member may be a location at which a user's hand, clothing, etc. could become entangled, thus risking injury.

Various embodiments relate to boom-type post hole diggers that are generally designed to dig vertical and cylindrically shaped holes. Such post hole diggers may be coupled to a tractor hitch or other coupling, and may be powered by a PTO or hydraulic power source.

In various embodiments, post hole diggers comprise torque limiting means. Torque limiting means include, but are not limited to, shear bolts, shear pins, slip clutches, pressure relief valves, and other devices generally designed to limit the amount of torque transmitted from one member to another. In one embodiment, torque limiting means are used to attach or couple and limit the amount of torque transmittable between a power source and a rotating portion of the post hole digger. These torque limiting devices are used to address the shearing of components and to prevent the safety issues related thereto. In one embodiment, torque limiting means are used to limit the amount of torque transmittable between a power source and a gearbox. As will be recognized by one of skill in the art, torque limiting features may be provided at any one or more locations adapted for transmitting rotational energy. Thus, the present disclosure is not limited to any one embodiment in which torque limiting means or features are disposed at a specific location or union.

In an embodiment, it may be desirable to provide access to various portions of a post hole digger when the device is not in operation, yet generally prevent access to various portions of the device while it is in operation. For example, where shear bolts or pins are utilized, the device may require access for maintenance or repair/replacement of shear bolts or pins. Similarly, however, it may be desirable to restrict or prevent such access when the device is in operation (i.e. power is being supplied to the device and/or various members comprise kinetic energy) for various safety reasons.

One embodiment comprises a post hole digger having one or more selectively positionable guards. In one embodiment, a guard is adapted to be opened, removed, or disengaged through (for example) the use of manual force. In one embodiment, a guard is provided that is adapted to be repositioned or adjusted in a manner to provide access to other components, yet is not readily or easily removable from the remainder of the device.

In one embodiment, one or more guard members may be open or closed, and may be biased toward a closed position (i.e. a position that substantially surrounds and/or isolates a coupling mechanism or region). One or more guards may be biased or otherwise adapted to rest in a closed position in the absence of an external force. In one embodiment, one or more guards utilize a logic control mechanism wherein a switch, a sensor, or similar device prevents operation of the auger while the guard(s) is/are not in an appropriate (e.g. closed) position.

In various embodiments, a post hole digger as described herein may be adapted to be attached to or communicate with various devices and vehicles including, but not limited to, tractors, front-end loaders, loaders, skid-loaders, excavators, and similar utility vehicles/products.

Referring now to FIGS. 1-7, a post hole digger 100 according to various embodiments is shown. Post hole digger 100 comprises a boom 102 for supporting and/or controlling the post hole digger 100, a yoke 104, a driveline 106 for conveying rotational energy, a gearbox 108 for transmitting rotational energy, an input guard 110, an output guard 112, and an auger 114. In various embodiments, an auger 114 comprises flighting 116, cutting teeth 118, and a center point 120.

In one embodiment, a boom 102 comprises a structure for connecting an upper link point of a tractor three-point hitch (or similar coupling) to a gearbox 108. The yoke 104 comprises a frame connecting lower hitch points to the boom 102 and is adapted to lift and/or support the post hole digger 100. A gearbox 108 is provided to transfer rotational power from the driveline 106 to the output shaft (e.g. auger 114) and, in an embodiment, change the rotational speed of the output shaft.

An auger 114 is provided and is adapted to be lowered into soil or ground in order to excavate or dig holes. As will be recognized by one of ordinary skill, augers may be provided in any number of diameters, lengths, and or pitches.

In various embodiments, auger retaining bolts may be provided, the auger retaining bolts generally comprising a bolt disposed through auger tube walls and a portion of an output shaft for transmitting torque from the output shaft to the auger and/or for holding an auger in position on an output shaft.

Flighting 116 is generally comprised of material formed and attached in such a way as to move soil or material in a generally upward direction. Cutting teeth 118 comprise features generally disposed at a distal end of the driven member to facilitate loosening of material. A center point 120 may be provided, the center point 120 is configured as a protrusion from the lower end of the driven member adapted to center the driven member in a given position. In various embodiments, center points are removable and/or interchangeable.

In various embodiments, at least one of an input guard 110 and an output guard 112 are biased toward a position whereby the connection/coupling between a driveline 106 and a gearbox 108 is at least partially surrounded or covered. In one embodiment, input and output guards (110, 112) fully encompass (i.e. 360 degrees around) the rotating axis of the implement input driveline 106 and/or the rotating axis of an auger 114 or similar extending members. In an alternative embodiment, input and output guards (110, 112) encompass a majority of a circumference of a connection point between rotating members (i.e. between approximately 180 and 360 degrees). A lack of appropriate safety guards will generally leave rotating members exposed and create a potential for objects, clothing, hair, and appendages to become entangled or entrapped, potentially causing great harm to user(s).

In various embodiments, guards comprise one or more tamper-resistant fasteners 122 for attaching and securing guards to another portion of the device. Tamper resistant fasteners may include, but are not limited to, various a-typical or non-standard fasteners, such as those available from Bryce Fastener Manufacturing & Design and Tamperproof Screw Company, Inc., permanent or semi-permanent connections, such as welds, rivets, etc., and devices disclosed in U.S. Pat. No. 7,097,404 to Avganim, which is incorporated by reference herein.

In various embodiments, input and/or output guards (110, 112) comprise features adapted for preventing the operation of the device when the guards are not appropriately positioned. For example, a sensor 124 may be provided and configured to indicate proper alignment of the guard and/or to trigger a power shutoff when the guard is not properly aligned.

In one embodiment, guards are provided that comprise one or more hinged portions (110a, 110b, 112a, 112b). One or more of the hinged portions may be required to be in communication with another portion of the device or another hinged portion to enable operation of an input and/or output shaft (106, 114). For example, one or more hinged portions may comprise an electrical signal or current adapted to be transmitted to or from the hinged portion when the hinged portion is in a closed position; the signal or current providing the required command to additional components of the system to allow for operation. Thus, according to various embodiments, a post hole digger is rendered generally inoperable at least when one guard member is in an open position.

For example, in one embodiment, distal ends of a guard are adapted to hinge open or apart from one another and, when in a closed state, complete an electrical circuit. The completed circuit achieved by placing the distal ends of a guard in contact with one another allows for a communication signal or current to be supplied to a power source and/or driveline, thereby enabling rotation/operation of the device. Conversely, when at least one guard is in an open position, the circuit is broken and the communication signal or current necessary to initiate, continue, or otherwise enable an engine and driveline to operate is not capable of being transmitted. Thus, the guard members are required to be in a closed position in order to conduct drilling and digging operations.

Figure 7:
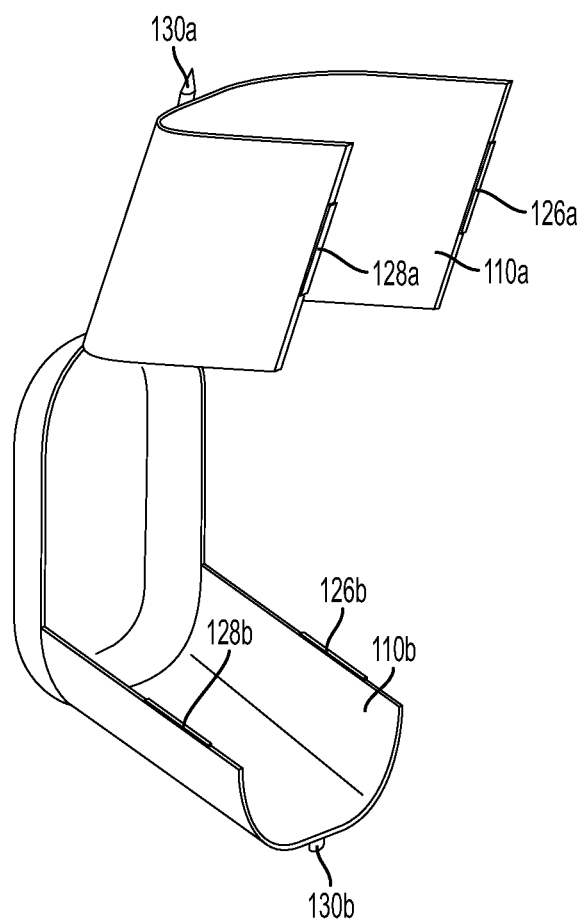
FIG. 7 illustrates a safety guard in accordance with various embodiments.

FIG. 7 shows electrical contacts 126a, 126b, 128a, and 128b configured for electrical contact/connection when hinged portions 110a and 110b are in a closed position.

In various embodiments, guards comprise a latch or locking mechanism 130a, 130b for securely closing or locking the guard in a closed position. In one embodiment, the locking or latching mechanism further comprises the completion of a circuit or electrical connection. The completion of the circuit or electrical connection may be a required element for relaying or transmitting information to additional components of the device, such as a power source. Accordingly, power may not be provided to rotational components of the system when a guard and corresponding latching mechanism are not closed and/or secured. Thus, overall safety of the system is increased by the implementation of logic which generally prevents rotational movement of at least certain features of the device when one or more guard members are not in a predetermined (e.g. closed) position.

In various embodiments, one or more guard members are biased toward a closed position at least partially in response to a force applied by a device selected from the group including but not limited to: a coil spring, a leaf spring, a magnet, an elastomeric band, a gravity operated member, and a hydraulic piston.

In various embodiments, guards are fastened with tamper-resistant fasteners such that a common user is rendered incapable or unlikely to be able to remove the fasteners and open the guards. Thus, in various embodiments, professional tooling and maintenance is required in order to repair, access, or perform maintenance on various system components.

In an embodiment, a guard that is configured to be opened may be further configured to remain coupled to the post hole digger by one or more mechanisms including a tether, hinge, or other such device.

In various embodiments, an input guard 110 extends along and surrounds a majority of a longitudinal length of a driveline 106. For example, in one embodiment, an input guard 110 extends at least from a center location of a union at a first end to at least a center location of a union at a second end of a driveline.

In an alternative embodiment, a driveline 106 is equipped with at least two guards. For example, in one embodiment, a first guard is provided at a first end proximal to a rotational power source and a second guard is positioned at a second end generally distal from a rotational power source. In one embodiment, a post hole digger is provided having at least three guards, two being disposed on a driveline and a third disposed on or proximal to an output shaft.

In various embodiments, a post hole digger is provided comprising various warning indicia, such as notations appearing on the post hole digger underneath the intended placement of the guards warning the user about the misplacement of the guard. In another embodiment, a post hole digger comprises an alarm adapted to alert a user or operator that one or more guards is in an open position. Alarms include, but are not limited to, various audio alarms, visual alarms, and combinations thereof. Accordingly, in one embodiment, where the presence of contact between one or more hinged portions of a guard is not detected, the post hole digger is adapted to communicate information to a user and surrounding persons through various alarm features.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A drilling apparatus, comprising:
a boom adapted to be pivotally connected to a frame of a tractor, the boom being pivotable relative to the frame about a substantially horizontal pivot axis;
a yoke member hingedly connected to the boom and adapted to be connected to the frame;
an auger rotatably mounted to the boom at or near the distal end of the boom;
a driveline for transmitting rotational energy to an auger, said driveline comprising a first end and a second end, the first end of the driveline being disposed proximal to the frame and the second end of the driveline being disposed distal to the frame;
a gearbox for transferring rotational power from the driveline to the auger; and
a guard member substantially enclosing a rotating member of the drilling apparatus, wherein the rotating member of the drilling apparatus includes at least a connection between the driveline and the gearbox or a connection between the auger and the gearbox.

2. The drilling apparatus of claim 1, wherein the guard member comprises at least two portions hingedly coupled to each other.

3. The drilling apparatus of claim 1, wherein the guard member is configured to be opened and closed, placing the guard member in an open position and a closed position respectively, and is biased toward the closed position.

4. The drilling apparatus of claim 3, wherein the guard member, placed in the closed position, substantially encloses a rotating member of the drilling apparatus.

5. The drilling apparatus of claim 3, wherein rotation of at least one of the driveline or the auger is substantially prevented in response to placement of the guard member into the open position.

6. The drilling apparatus of claim 1, wherein the guard member comprises fasteners coupling the guard member to the drilling apparatus, the fasteners configured to resist tampering.

7. The drilling apparatus of claim 1, wherein the drilling apparatus is adapted to prevent the transmission of rotational energy upon the application of a predetermined torque.

8. The drilling apparatus of claim 1, wherein the guard member is adapted for communicating with the driveline and preventing rotation of the driveline in response to placement of the guard member into a predetermined position.

9. The drilling apparatus of claim 1, wherein the driveline is driven by an engine and the guard member is configured for communicating with the engine and preventing operation of the engine in response to placement of the guard member into a predetermined position.

10. The drilling apparatus of claim 1, wherein the guard member is configured for communicating with the auger and preventing operation of the auger in response to placement of the guard member into a predetermined position.

11. A guard member configured for coupling to a rotational drilling apparatus, the guard member comprising:
- a body, comprising at least a first portion and a second portion, a cavity for receiving a rotating member of the drilling apparatus, and one or more holes to enable coupling of the guard member to the drilling apparatus, wherein the rotating member of the drilling apparatus includes at least a connection between a gearbox and either of a driveline or an auger of the drilling apparatus;
- a coupling element configured to couple the first portion and the second portion to each other;
- wherein the guard member is configured to be opened and closed, placing the guard member in an open position and a closed position, respectively, and is biased toward the closed position; and
- wherein the guard member, placed in the closed position, substantially encloses at least the rotating member of the drilling apparatus.

12. The guard member of claim 11, wherein the coupling element comprises a hinge.

13. The guard member of claim 11, wherein the coupling element comprises a latch.

14. The guard member of claim 11, further comprising a sensor coupled to the guard member and configured to sense a position of the first portion and/or second portion of the body of the guard member.

15. The guard member of claim 11, wherein the first portion and the second portion of the body of the guard member comprise electrical contacts configured to complete a circuit in response to contacting each other.

* * * * *